(12) United States Patent
Stadermann et al.

(10) Patent No.: US 9,495,347 B2
(45) Date of Patent: Nov. 15, 2016

(54) SYSTEMS AND METHODS FOR EXTRACTING TABLE INFORMATION FROM DOCUMENTS

(71) Applicants: Jan Stadermann, Rheinbach (DE); Stephan Symons, Bonn (DE); Ingo Thon, Bonn (DE)

(72) Inventors: Jan Stadermann, Rheinbach (DE); Stephan Symons, Bonn (DE); Ingo Thon, Bonn (DE)

(73) Assignee: Recommind, Inc., San Francisco, CA (US)

( * ) Notice: Subject to any disclaimer, the term of this patent is extended or adjusted under 35 U.S.C. 154(b) by 0 days.

(21) Appl. No.: 13/943,668

(22) Filed: Jul. 16, 2013

(65) Prior Publication Data

US 2015/0026556 A1  Jan. 22, 2015

(51) Int. Cl.
*G06F 17/00* (2006.01)
*G06F 17/24* (2006.01)

(52) U.S. Cl.
CPC ............ *G06F 17/245* (2013.01); *G06F 17/247* (2013.01)

(58) Field of Classification Search
CPC ............... G06F 17/241; G06F 17/245–17/247
USPC ............... 715/227, 228, 212, 230, 232, 200
See application file for complete search history.

(56) References Cited

U.S. PATENT DOCUMENTS

| | | | |
|---|---|---|---|
| 5,826,257 A * | 10/1998 | Snelling, Jr. | |
| 5,950,196 A * | 9/1999 | Pyreddy et al. | 715/227 |
| 6,222,530 B1 * | 4/2001 | Sequeira | 715/201 |
| 6,546,385 B1 * | 4/2003 | Mao et al. | 707/711 |
| 8,266,148 B2 * | 9/2012 | Guha | G06F 17/30867 707/737 |
| 8,443,013 B1 * | 5/2013 | Lin et al. | 707/810 |
| 8,566,897 B2 * | 10/2013 | Sequeira | 725/145 |
| 8,589,394 B2 * | 11/2013 | Vignet | 707/736 |
| 8,943,397 B2 * | 1/2015 | Palleschi | G06F 17/247 715/212 |
| 9,146,916 B2 * | 9/2015 | Moroze | G06F 17/245 |
| 2002/0040375 A1 * | 4/2002 | Simon et al. | 707/517 |
| 2003/0018668 A1 * | 1/2003 | Britton | G06F 17/241 715/230 |
| 2003/0191727 A1 * | 10/2003 | Yao et al. | 706/20 |
| 2003/0229854 A1 * | 12/2003 | Lemay | 715/513 |
| 2006/0010029 A1 * | 1/2006 | Gross | 705/10 |
| 2006/0155703 A1 * | 7/2006 | Dejean | G06F 17/2247 |
| 2007/0011134 A1 * | 1/2007 | Langseth | G06F 17/30563 |
| 2007/0214010 A1 * | 9/2007 | Beaver | G06F 17/248 705/2 |
| 2007/0271249 A1 * | 11/2007 | Cragun et al. | 707/3 |

(Continued)

FOREIGN PATENT DOCUMENTS

| | | |
|---|---|---|
| EP | 3022659 | 5/2016 |
| WO | WO2015009297 | 1/2015 |

OTHER PUBLICATIONS

Lerman et al., Using the Structure of Web Sites for Automatic Segmentation of Tables, ACM 2004, pp. 119-130.*

(Continued)

*Primary Examiner* — Cong-Lac Huynh
(74) *Attorney, Agent, or Firm* — Carr & Ferrell LLP

(57) ABSTRACT

Systems and methods for extracting table information from documents are provided herein. Exemplary methods may include annotating a document with annotations that identify table cell data included therein, generating a candidate table for each of a plurality of table models using the annotated table cell data, scoring each of the candidate tables, selecting a highest scoring candidate table, and annotating the highest scoring table to produce a final table.

24 Claims, 17 Drawing Sheets

Final Table

(56) References Cited

U.S. PATENT DOCUMENTS

| | | | |
|---|---|---|---|
| 2008/0172597 A1* | 7/2008 | DeHaan | 715/222 |
| 2008/0294679 A1 | 11/2008 | Gatterbauer et al. | |
| 2009/0013246 A1* | 1/2009 | Cudich et al. | 715/234 |
| 2009/0044095 A1* | 2/2009 | Berger et al. | 715/226 |
| 2009/0067717 A1* | 3/2009 | Iwasaki | 382/173 |
| 2009/0148048 A1* | 6/2009 | Hosomi | G06F 17/30705 382/190 |
| 2009/0175532 A1* | 7/2009 | Zuev | G06K 9/00469 382/159 |
| 2009/0300043 A1* | 12/2009 | MacLennan | G06F 17/2818 |
| 2010/0106485 A1* | 4/2010 | Lu | G06Q 30/02 704/9 |
| 2010/0138894 A1* | 6/2010 | Kyojima | G06F 21/6218 726/1 |
| 2010/0161627 A1* | 6/2010 | Vossen | G06F 17/30286 707/755 |
| 2010/0257144 A1* | 10/2010 | Lambert et al. | 707/689 |
| 2010/0325690 A1* | 12/2010 | Suzuki et al. | 726/1 |
| 2011/0047166 A1* | 2/2011 | Stading | G06F 17/30637 707/749 |
| 2011/0106892 A1* | 5/2011 | Nelson | G06Q 10/109 709/206 |
| 2011/0141521 A1* | 6/2011 | Qiao | 358/1.16 |
| 2011/0153647 A1* | 6/2011 | Hoellwarth | 707/769 |
| 2012/0011428 A1* | 1/2012 | Chisholm | 715/230 |
| 2012/0191865 A1* | 7/2012 | Duff et al. | 709/228 |
| 2012/0221583 A1* | 8/2012 | Kulack | G06F 17/30696 707/755 |
| 2013/0013999 A1* | 1/2013 | Kerry-Tyerman et al. | 715/230 |
| 2013/0117012 A1* | 5/2013 | Orlin | G06F 17/277 704/9 |
| 2013/0124960 A1* | 5/2013 | Velingkar et al. | 715/220 |
| 2013/0198123 A1* | 8/2013 | Stadermann et al. | 706/46 |
| 2013/0238550 A1* | 9/2013 | Mandelstein | G06F 17/30563 707/602 |
| 2013/0238596 A1* | 9/2013 | Mandelstein et al. | 707/714 |
| 2013/0311490 A1* | 11/2013 | Mansfield | G06F 17/211 707/755 |
| 2014/0052755 A1* | 2/2014 | Pitman | G06F 17/30424 707/771 |
| 2014/0122535 A1* | 5/2014 | Gerard et al. | 707/802 |
| 2015/0058374 A1* | 2/2015 | Golubev | G06K 9/00469 707/769 |
| 2015/0324338 A1* | 11/2015 | Levy | G06F 17/211 715/244 |

OTHER PUBLICATIONS

Silva et al., Design of an End-to-end Method to Extract Information from Tables, Google 2006, pp. 144-171.*

Wenzel et al., An Approach to Context-driven Document Analysis and Understanding, Google 2003, pp. 1-12.*

Wang et al., Data Extraction and Label Assignment for Web Database, ACM 2003, pp. 187-196.*

Shafait et al., Table Detection in Heterogeneous Documents, ACM 2010, pp. 65-72.*

Eberius et al., Building the Dresden Web Table Corpus: A Classification Approach, IEEE 2015, pp. 41-50.*

Pyreddy, Pallavi, et al., "Tintin: A system for retrieval in text tables", Proceedings of the second ACM international conference on Digital libraries. ACM, 1997.

Pinto, David, et al., "Table extraction using conditional random fields", Proceedings of the 26th annual international ACM SIGIR conference on Research and development in information retrieval. ACM, 2003.

Chen, Hsin-Hsi, et al., "Mining tables from large scale HTML texts", Proceedings of the 18th conference on Computational linguistics—vol. 1, Association for Computational Linguistics, 2000.

Tengli, Ashwin, et al., "Learning table extraction from examples," Proceedings of the 20th international conference on Computational Linguistics, Association for Computational Linguistics, 2004.

Gatterbauer, Wolfgang, et al., "Table extraction using spatial reasoning on the CSS2 visual box model", Proceedings of the National Conference on Artificial Intelligence. vol. 21. No. 2, Menlo Park, CA; Cambridge, MA; London; AAAI Press; MIT Press; 1999, 2006.

Liu, Ying, et al., "Tableseer: automatic table metadata extraction and searching in digital libraries", Proceedings of the 7th ACM/IEEE-CS joint conference on Digital libraries, ACM, 2007.

Liu, Ying, et al., "Improving the table boundary detection in pdfs by fixing the sequence error of the sparse lines", Document Analysis and Recognition, 2009, ICDAR'09, 10th International Conference on IEEE, 2009.

Yildiz, Burcu, et al., "pdf2table: A method to extract table information from pdf files." 2nd Indian Int. Conf. on AI, Pune. 2005.

RecoStar OCR Solution OpenText Corp., Waterloo, ON, Canada; <http://www.opentext.com>, accessed Oct. 29, 2013.

OmniPage, Nuance Communications, Inc., Burlington, Mass., USA; <http://www.nuance.com/for-business/by-product/omnipage/index.htm> accessed Oct. 29, 2013.

International Search Report and Written Opinion mailed Dec. 23, 2013 in Patent Cooperation Treaty application No. PCT/US2013/050954, filed Jul. 17, 2013.

* cited by examiner (i) *Interest Rate.* The "Interest Rate" in relation to each Eligible Currency specified below will be:

| Eligible Currency | Interest Rate |
|---|---|
| EUR | EONIA as defined below |
| GBP | SONIA as defined below |
| JPY | JPY-TONA as defined below |
| US$ | US$ - Federal Funds - H.15 (519) "Federal Funds (Effective)" |

| Eligible Currencies | Interest Rate |
|---|---|
| SEK | STIBOR |
| EUR | EONIA |

— 205

— 210

| Currency | Interest Rate |
|---|---|
| United States Dollars | The "Interest Rate" shall be, with respect to Eligible Collateral in the form of Cash, for any day, the rate equal to the rate opposite the caption "Federal Funds (Effective)" for such day as published for such day in Federal Reserve Publication H.15(519) (or any successor publication) as published by the Board of Governors of the U.S. Federal Reserve System. |
| Euros | For any day the overnight rate as calculated by the European Central Bank and fixed between 6:45 and 7:00 p.m. CET as appearing on the Reuters page EONIA (or such other page as may replace such page for the purpose of displaying the EONIA rate displayed thereon) on the first TARGET Settlement Day (as defined in the 2006 ISDA Definitions) following that day. |
| Pound Sterling | The Wholesale Market Brokers Associations Sterling Overnight Index (SONIA) which appears on Reuters Page SONIA1 (or such other page as may replace such page for the purpose of displaying the SONIA rate displayed thereon), determined each day any part of the Credit Support Balance comprises Sterling. |
| Any other currency as agreed between the parties from time to time | Such interest rate as may be agreed between the parties in respect of the chosen currency. |

— 215

220

(i) *Interest Rate.* The "Interest Rate" in relation to Eligible Currency denominated in US Dollars, for any day will be, the rate opposite the caption "Federal Funds (Effective Rate)" for such day as published by the Federal Reserve Publication H.15(519) or any successor publication as published by the Board of Governors of the Federal Reserve System. The "Interest Rate" in relation to Eligible Currency denominated in Euro, for any day will be, the rate EONIA (Euro Over Night Index Average) for such day as daily established by the European Central Bank on Bridge page 247 Eonia minus 9.5 basis points. The "Interest Rate" in relation to Cash denominated in UK Sterling will be, the rate SONIA (Sterling Overnight Index Average) minus 12.5 basis points for such day as calculated by the Wholesale Market Brokers Association which appears on Reuters screen SONIA. Rates for other Eligible Currencies shall be mutually agreed between the parties at the time of application.

*FIG. 2*

Final Table

Threshold means with respect to Party A:

| Rating Standard and Poors | Rating Moody's | Amount (USD) |
|---|---|---|
| AAA to AA- | Aaa to Aa3 | 10,000,000 |
| A+ to A- | A1 to A3 | 5,000,000 |
| BBB+ to BBB- | Baa1 to Baa3 | 2,500,000 |
| BB+ and below | Ba1 and below | Zero |

— 405

OCR introduces errors and removes or reorders table items

OCR Outcome 1 — 410A

OCR Outcome 2 — 410B

FIG. 4A

| S&P Rating | Moody's Rating | Threshold Party A in Euro (millions) |
|---|---|---|
| AAA | Aaa | 45 |
| AA+ | Aa1 | 25 |
| AA | Aa2 | 20 |
| AA- | Aa3 | 20 |
| A+ | A1 | Zero |
| A | A2 | Zero |
| A- | A3 | Zero |
| BBB+ | Baa1 | Zero |
| BBB | Baa2 | Zero |
| BBB- | Baa3 | Zero |
| Below BBB- | Below Baa3 | Zero |

*Original Table in Document*

*FIG. 6A*

OCR and Collect Table

| S & P Rating | Moody's Rating | Threshold Party A (in Euro (millions) |
|---|---|---|
| AAA | Aaa | 45 |
| AA+ | Aa1 | 25 |
| AA | Aa2 | 20 |
| AA- | Aa3 | 20 |
| A+ | A1 | Zero |
| A | A2 | Zero |
| A- | A3 | Zero |
| BBB+ | Baa1 | Zero |
| BBB | Baa2 | Zero |
| BBB- | Baa3 | Zero |
| Below BBB- | Below Baa3 | Zero |

FIG. 6B

|     | 805                                                                                                                                                                                                                                              | Party A | Party B | Valuation Percentage |
| --- | --- | --- | --- | --- |
| (A) | Cash, in the Eligible Currency | NO | NO | -- |
| (B) | negotiable debt obligations issued by the Governments of the United States of America, United Kingdom, France, Germany and Denmark (excluding inflation-linked bonds) having a residual maturity of not more than one year. | Yes | Yes | 98% |
| (C) | Negotiable debt obligations issued by the Governments of the United States of America, United Kingdom, France, Germany and Denmark (excluding inflation-linked bonds) having a residual maturity of more than one year but not more than five years | Yes | Yes | 97% |
| (D) | negotiable debt obligations issued by the Governments of the United States of America, United Kingdom, France, Germany and Denmark (excluding inflation-linked bonds) having a residual maturity of more than five year but not more than ten years | Yes | Yes | 95% |
| (E) | Negotiable debt obligations issued by the Governments of the United States of America, United Kingdom, France, Germany and Denmark (excluding inflation-linked bonds) having a residual maturity at issuance of more than ten years | Yes | Yes | 90% |

*FIG. 8A*

OCR Output (A) Cash, in the Eligible Currency NO NO
( B negotiable debt obligations issued Yes Yes 98 %
by the Governments of the United States of America, United Kingdom, France,
Germany and Denmark ( excluding inflation - linked bonds ) having a residual
maturity of not more than one year.

( C ) Negotiable debt obligations issued Yes Yes 97 %
by the Governments of the United States of America, United Kingdom, France,
Germany and Denmark ( excluding inflation - linked bonds ) having a residual
maturity of more than one year but not more than five years D ) negotiable debt obligations issued Yes Yes 95 %
by the Governments of the United States of America, United Kingdom, France,
Germany and Denmark ( excluding inflation - linked bonds ) having a residual
maturity of more than five year but not more than ten years ( E ) Negotiable debt obligations issued Yes Yes 90 %
by the Governments of the United States of America, United Kingdom, France,
Germany and Denmark ( excluding inflation - linked bonds ) having a residual
maturity at issuance of more than ten years Normalized Extraction Result

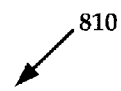

*FIG. 8B*

Example C - Interest Rate Tables
Examples of different complexity shown with OCR result and final table.

i. *Interest Rate*. The "Interest Rate" in relation to Eligible Currency denominated in Euro shall be one month EURIBOR, as stated on Telerate page 248. ← 1005

| Currency | Reference Rate | Maturity | Spread (bps) | Valuation Frequency |
|---|---|---|---|---|
| EUR | EURIBOR | 1 month | Not specified | |

← 1010

*(1) Interest Rate*. The "Interest Rate" in relation to Eligible Currency denominated in US Dollars, for any day will be, the rate opposite the caption " Federal Funds ( Effective Rate ) " for such day as published by the Federal Reserve Publication H . 15 ( 519 ) or any successor publication as published by the Board of Governors of the Federal Reserve System . The " Interest Rate " in relation to Eligible Currency denominated in Euro , for any day will be , the rate EONIA ( Euro Over Night Index Average ) minus 8.5 basis point for such day as displayed on Reuters screen EONIA ≈ . Interest Rate " in relation to Cash denominated in Sterling will be , the rate SONIA ( Sterling Overnight Index ) minus 12.5 basis point for such day as displayed on Reuters screen SONIAOSR ≈ . Rates for other Eligible Currencies shall be mutually agreed between the parties at the time of application .

| Currency | Reference Rate | Maturity | Spread (bps) | Valuation Frequency |
|---|---|---|---|---|
| USD | Fed Funds (Effective) | Overnight | Not specified | |
| EUR | EONIA | Overnight | -8.5 | |
| GBP | SONIA | Overnight | -12.5 | | i. Interest Rate. "Interest Rate" means, for any day, with respect to each Eligible Currency shall be:

USD Reuters page FEDFUNDS1 Effective Rate    ← 1015
EUR Reuters page EONIA ≈
GBP Reuters page SONIAOSR ≈

| Currency | Reference Rate | Maturity | Spread (bps) | Valuation Frequency |
|---|---|---|---|---|
| USD | Fed Funds (Eff) | Overnight | Not specified | |
| EUR | EONIA | Overnight | Not specified | |
| GBP | SONIA | Overnight | Not specified | | i. Interest Rate. The "Interest Rate" in relation to each Eligible Currency specified below will be:

← 1020

Eligible Currency Interest Rate

SEK STIBOR

EUR EONIA

| Currency | Reference Rate | Maturity | Spread (bps) | Valuation Frequency |
|---|---|---|---|---|
| SEK | STIBOR T/N | Overnight | Not specified | |
| EUR | EONIA | Overnight | Not specified | |

SYSTEMS AND METHODS FOR EXTRACTING TABLE INFORMATION FROM DOCUMENTS

FIELD OF THE INVENTION

The present invention relates generally to table extraction, and more specifically, but not by way of limitation, to systems and methods that extract tables from a wide range of structured and unstructured documents in such a way that no prior knowledge of table layout, whitespace patterns, or other information related to the structure of tables (or data that can be represented in table format) included in an unstructured document, is required.

BACKGROUND

Various processes may be used to extract information from structured documents such as contracts, web pages, and so forth. Additionally, many types of features can extracted from these documents including text data, table data, drawings, and the like, if the document is formatted in such a way that the desired information is not obscured, unstructured, or structured in a manner that is inconsistent with or unexpected by the logic used to extract information from documents.

Information extraction processes may utilize optical character recognition, as well as other content extraction methods to convert documents in an un-editable form into a machine readable and editable form. For example, a collection of scanned images may be transformed into an editable word processing document. Unfortunately, these OCR (optical character recognition) processes may introduce distortions or errors into the documents. Furthermore, extracting features such as tables or drawings require specific schemas or logic that can be used to inspect documents for layouts or other patterns that are indicative of these features. When these layouts or patterns are not present, extraction becomes difficult, if not impossible. Moreover, if a feature is presented within the document in an unexpected format, the extraction process may be unable to locate the feature.

SUMMARY

According to some embodiments, the present disclosure is directed to a method for extracting table information from an unstructured document using a table extraction system that comprises a processor and table extraction logic stored in memory. The processor executes the table extraction logic to perform operations comprising: (a) annotating a document with annotations that identify table cell data included therein; (b) generating a candidate table for each of a plurality of table models using the annotated table cell data; (c) scoring each of the candidate tables; (d) selecting a highest scoring candidate table; and (e) selecting a final table from the candidate tables using the scores.

According to some embodiments, the present disclosure is directed to a table extraction system for extracting table information from an unstructured document. The table extraction system comprising: (a) a processor; and (b) a memory for storing table extraction logic that when executed by the processor causes the table extraction system to: (i) annotate a document with basic annotations that identify table cell data included therein, the basic annotations being determined from domain knowledge regarding the document; (ii) extract the annotated table cells from the document using a table model; (iii) verify the extractions using the domain knowledge; and (iv) generate an extracted table from the annotated table cells using a table filling strategy.

According to some embodiments, the present disclosure is directed to a method for automatic generation of table models using a table extraction system that comprises a processor and table extraction logic stored in memory, wherein the processor executes the table extraction logic to perform operations comprising: (a) receiving a column set comprising column types and column parameters, wherein each column in the column set is annotated as optional or non-optional; and (b) generating a plurality of table models from permutations of combinations of columns in the column set.

BRIEF DESCRIPTION OF THE DRAWINGS

Certain embodiments of the present technology are illustrated by the accompanying figures. It will be understood that the figures are not necessarily to scale and that details not necessary for an understanding of the technology or that render other details difficult to perceive may be omitted. It will be further understood that the technology is not necessarily limited to the particular embodiments illustrated herein.

FIG. 2 illustrates several examples for input documents;

FIG. 3A illustrates an exemplary process for applying table models to an annotated document to generate candidate tables, and FIG. 3B illustrates scores for the candidate tables, as well as the selection of a highest ranking candidate table, as well as an annotated final table;

FIGS. 4A and 4B collectively illustrate a portion of an exemplary process for extracting table information from a document, where FIG. 4A illustrates two potential OCR outcomes and FIG. 4B illustrates the use of filling strategies for a table model and the generation of candidate tables;

FIG. 6A-C collectively illustrate resolving OCR distortions during a table information extraction process, using normalization;

FIGS. 8A and 8B collectively illustrate an input document, OCR output generated from the input document, and normalized OCR output, shown in a UI format;

FIG. 10 illustrates another exemplary use case where OCR distortions are corrected using normalization of extracted table information;

FIG. 11 is an exemplary graphical user interface that includes a document and candidate tables that have been extracted from the document.

DETAILED DESCRIPTION OF EXEMPLARY EMBODIMENTS

Figure 1:
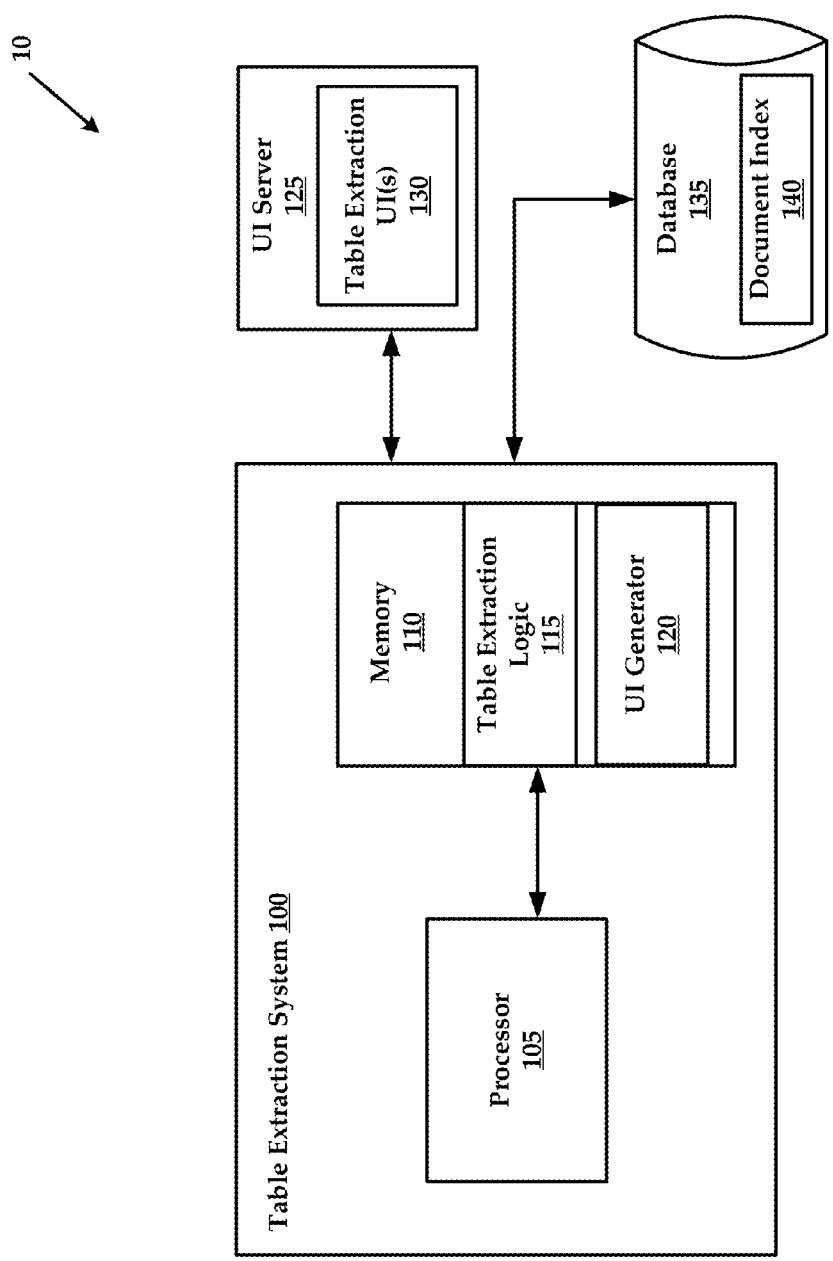
FIG. 1 is an exemplary system architecture that may be utilized to practice aspects of the present technology.

While this technology is susceptible of embodiment in many different forms, there is shown in the drawings and will herein be described in detail several specific embodiments with the understanding that the present disclosure is to be considered as an exemplification of the principles of the technology and is not intended to limit the technology to the embodiments illustrated.

It will be understood that like or analogous elements and/or components, referred to herein, may be identified throughout the drawings with like reference characters. It will be further understood that several of the figures are merely schematic representations of the present technology. As such, some of the components may have been distorted from their actual scale for pictorial clarity.

Reference throughout this specification to "one embodiment" or "an embodiment" means that a particular feature, structure, or characteristic described in connection with the embodiment is included in at least one embodiment of the present invention. Thus, the appearances of the phrases "in one embodiment" or "in an embodiment" or "according to one embodiment" (or other phrases having similar import) at various places throughout this specification are not necessarily all referring to the same embodiment. Furthermore, the particular features, structures, or characteristics may be combined in any suitable manner in one or more embodiments. Furthermore, depending on the context of discussion herein, a singular term may include its plural forms and a plural term may include its singular form. Similarly, a hyphenated term (e.g., "on-demand") may be occasionally interchangeably used with its non-hyphenated version (e.g., "on demand"), a capitalized entry (e.g., "Software") may be interchangeably used with its non-capitalized version (e.g., "software"), a plural term may be indicated with or without an apostrophe (e.g., PE's or PEs), and an italicized term (e.g., "N+1") may be interchangeably used with its non-italicized version (e.g., "N+1"). Such occasional interchangeable uses shall not be considered inconsistent with each other.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

It is noted at the outset that the terms "coupled," "connected", "connecting," "electrically connected," etc., are used interchangeably herein to generally refer to the condition of being electrically/electronically connected. Similarly, a first entity is considered to be in "communication" with a second entity (or entities) when the first entity electrically sends and/or receives (whether through wireline or wireless means) information signals (whether containing data information or non-data/control information) to the second entity regardless of the type (analog or digital) of those signals. It is further noted that various figures (including component diagrams) shown and discussed herein are for illustrative purpose only, and are not drawn to scale.

Generally speaking, the present technology provides systems and methods for extracting table information from documents. In some instances, the present technology is configured to extract table information from unstructured documents, where table information may be presented in an unconventional format, such as a paragraph, or an unconventionally structured table. The present technology may extract table information from these documents using annotation of basic table cells, which can be determined using domain knowledge regarding the document that is being processed. For example, if the document is a contract, the present technology may leverage this domain knowledge to use basic annotations to locate table information within the document. The table information is then annotated as table cell data.

These documents annotated with table cell data may be then processed using one or more table models and filling strategies to generate pluralities of candidate tables. The candidate tables can be scored using various techniques which will be described in greater detail below, to locate a highest scoring candidate table. The highest scoring candidate table can then be annotated and stored in an index as a final table.

Other advantages of the present technology include OCR distortion correction using domain knowledge and normalization techniques to improve the accuracy of the tables generated by the present technology. Additionally, user-defined and automatic generation of table models is also contemplated. These and other advantages of the present technology are provided herein with reference to the collective drawings (e.g., FIGS. 1-13).

Prior to a detailed discussion of these advantages, a contextual discussion regarding various approaches/solutions to extracting table information from documents is provided.

There are three major types of solutions to the problem of table extraction. These solutions vary with regard to the input required to extract table information. For example, table extraction methods from plain text files employ white space or delimiter patterns to identify tables. This information is used via sequence analysis methods, such as a character alignment graphs or Conditional Random Fields.

In other instances, if HTML files are used as input, different heuristics and machine learning based methods are used to distinguish table content from tables used for layout. In yet other instances, if rich documents (e.g., Office®, PDF, etc.) are available, the layout of the document is analyzed, using for example, a page box cutting algorithm. Extraction from PDF documents has also been attempted via conversion to HTML.

Additionally, OCR Suites provide also means for identifying tables, and some solutions also allow for extraction of identified tables via a set of search terms.

All of these methods suffer from drawbacks such as restricted input formats where input formats are restricted to well-formatted plain text, HTML or PDF documents. Plain text needs to have a fixed pattern of white space or other delimiters to aid in identification of table information. These methods also require restricted layouts where table data to be extracted must be in a classic row/column layout using whitespace, and possibly supporting lines or coloring. These restrictions limit the range of input suitable for extraction. Finally, these methods require significant processing resources. For example, statistical methods like Conditional Random Fields require significant processing time and memory, and are dependent on the features provided by methods that have the above restrictions.

Further, it is cumbersome to include domain knowledge into most table extraction methods. Adding more features to machine learning solutions potentially reduces accuracy, for example, by way of the "curse of dimensionality." Additionally, no known solution allows for direct extraction of nested tables.

Turning to the present technology, several non-limiting observations have been acknowledged and used to generate table extraction logic. Namely, a table column typically comprises data from a single domain (e.g. names, numbers, and so forth) and a specific type (e.g., bond type or bond issuer country). Using general purpose information extraction methods, these elements can be annotated (tagged) and used in subsequent extraction steps. The annotated elements are referred to as table cell data or annotated table cell data.

Thus, the present technology uses domain knowledge to prepare the basic items for a table with high confidence. For example, specifically configured methods can be used to detect OCR variants of items. In the context of a table containing bond ratings, it is valid to conclude 131313=BBB. With this conclusion, we cannot mistake "131313" for an amount, and can build a table from this text with high confidence.

Additionally, as long as every element in a table column appears in the text in the correct order, table columns can be restored, even though they are mixed with other table items. Thus, the present technology collects the extracted basic items into tabular frames, even when OCR or other sources of errors relocate text blocks in their output. If a deletion of an element occurs, the present technology uses different filling strategies for populating the table frames (table models) using the annotated table cell data in such a way that a complete (or at least properly formatted and aligned) table is generated. Thus, the present technology can use table models and filling strategies to generate candidate tables of varying format, and select the most correct candidate table.

The present technology may employ information extraction tools to enrich input documents with annotations that define the table cells. User-defined templates (table models) for tables are populated with the annotations within a range to build candidate tables. Several strategies for model population are examined and the highest scoring table candidate can be chosen.

Multi-dimensional data (tables) can be extracted from a wide range of unstructured documents, without requiring layout information or structured whitespace patterns, thus reducing memory requirements and making more types, quality ranges, and input formats accessible for table extraction. The present technology accommodates for plain text output of Optical Character Recognition systems and other noisy sources.

Furthermore, the present technology does not require multi-dimensional data to be expressed in tabular form, but may extract tabular data from all types of layouts.

FIG. 2 illustrates the extraction of key table elements in a Credit Support Annex. In this embodiment, the implementation encompasses a table identification scheme, normalization tools, and a scoring scheme. The implementation is embodied in the Java Programming language and used in a table extraction system that executes table extraction logic. A pipeline for the extraction of pluralities of types of tables used by the table extraction system may be based on the Apache UIMA framework.

FIG. 1 illustrates an exemplary architecture 10 that comprises a table extraction system 100, a UI server 125, and a database 135. These components are communicatively coupled by a network that may include any private or public network, which may include the Internet.

The table extraction system 100 is shown as comprising a processor 105 and memory 110. The memory 110 includes table extraction logic 115 and a UI generator 120. It is noteworthy that many of the components of the table extraction system 100 are discussed in greater detail relative to FIG. 12, which illustrates an exemplary computing system 1200. In some instances the table extraction system 100 may include a server, cloud resource, or other computing platform, virtual or physical. The table extraction system 100 is a particular purpose computing system that is configured to perform the methods and processes described herein. In more detail, the table extraction logic stored in memory 110, when executed by the processor 105, causes the table extraction system 100 to perform various operations.

The memory 110 may also include a UI generator 120 that is executed to generate various graphical user interfaces that are used to present extracted table information to a user, as well as allow the user to define table models, and execute other interactions with the table extraction system 100. Exemplary UIs generated by the UI generator 120 will be described throughout, with reference to exemplary use cases and embodiments. It will be understood table extraction UI(s) 130 may be generated by the UI generator 120 and displayed using a UI server 125, or other common method for providing UIs to an end user client device or program. Thus, in some instances, the table extraction UI(s) may be accessible via communication with the table extraction system 100, rather than the UI server 125.

The database 135 may be configured to store various types of information such as user-defined and automatically generated table models, domain information, annotation types, candidate tables, and annotated final tables, all of which will be described in greater detail herein.

FIG. 2 illustrates various table information types that are included in an exemplary document, such as a contract. Section 205 illustrates table information in the form of a semi-structured table with discernible whitespaces. Section 210 includes table information in paragraph form, and section 215 includes table information in a readily discernible table format, where table information can be extracted from paragraphs that are nested into a table. For example, in the Interest Rate column 220, each table cell data includes a text in paragraph form. This text may be processed to extract table cell data. Thus, this table cell data is "nested" within another table.

The table extraction system 100 may extract tables of any structure level and density solely from the document's OCR output at character level, in the absence of any layout information (e.g. geometry of text blocks or raw images). The table extraction system 100 does not require consistent whitespace patterns or enumerations within the table, though the table extraction system 100 may use such information for refinements. The table extraction system 100 uses basic annotations to the document as input. Using domain knowledge, these annotations can be extracted by the table extraction system 100 robustly and type-specific from OCR output, as well as other types of pre-processing output. The table extraction system 100 may exploit domain knowledge by automatically selecting potentially suitable table modes that refer to the different types of basic annotation found within a document.

Figure 3A:
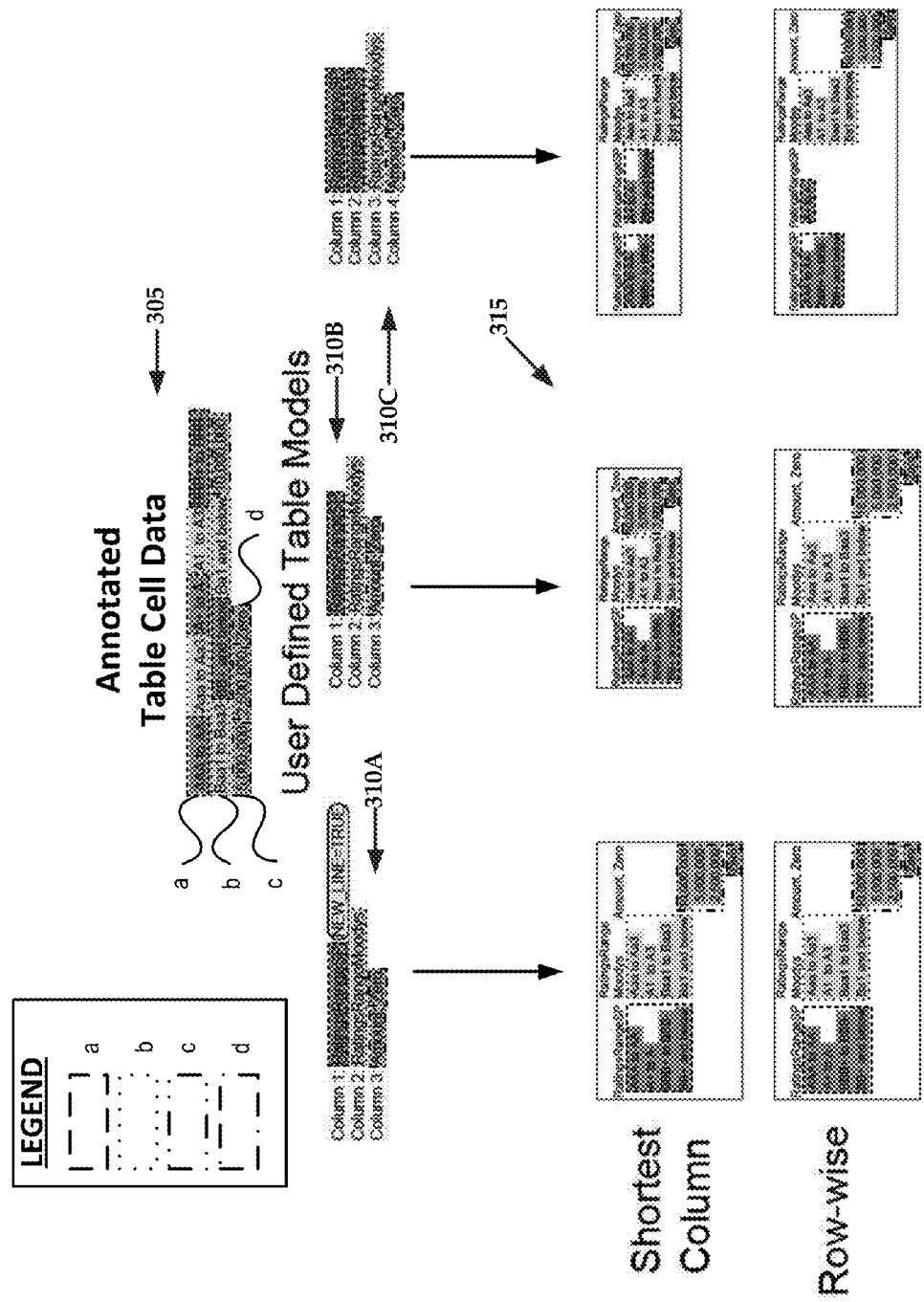
FIGS. 3A and 3B collectively illustrate a portion of an exemplary process for extracting table information from a document, where
Figure 3B:
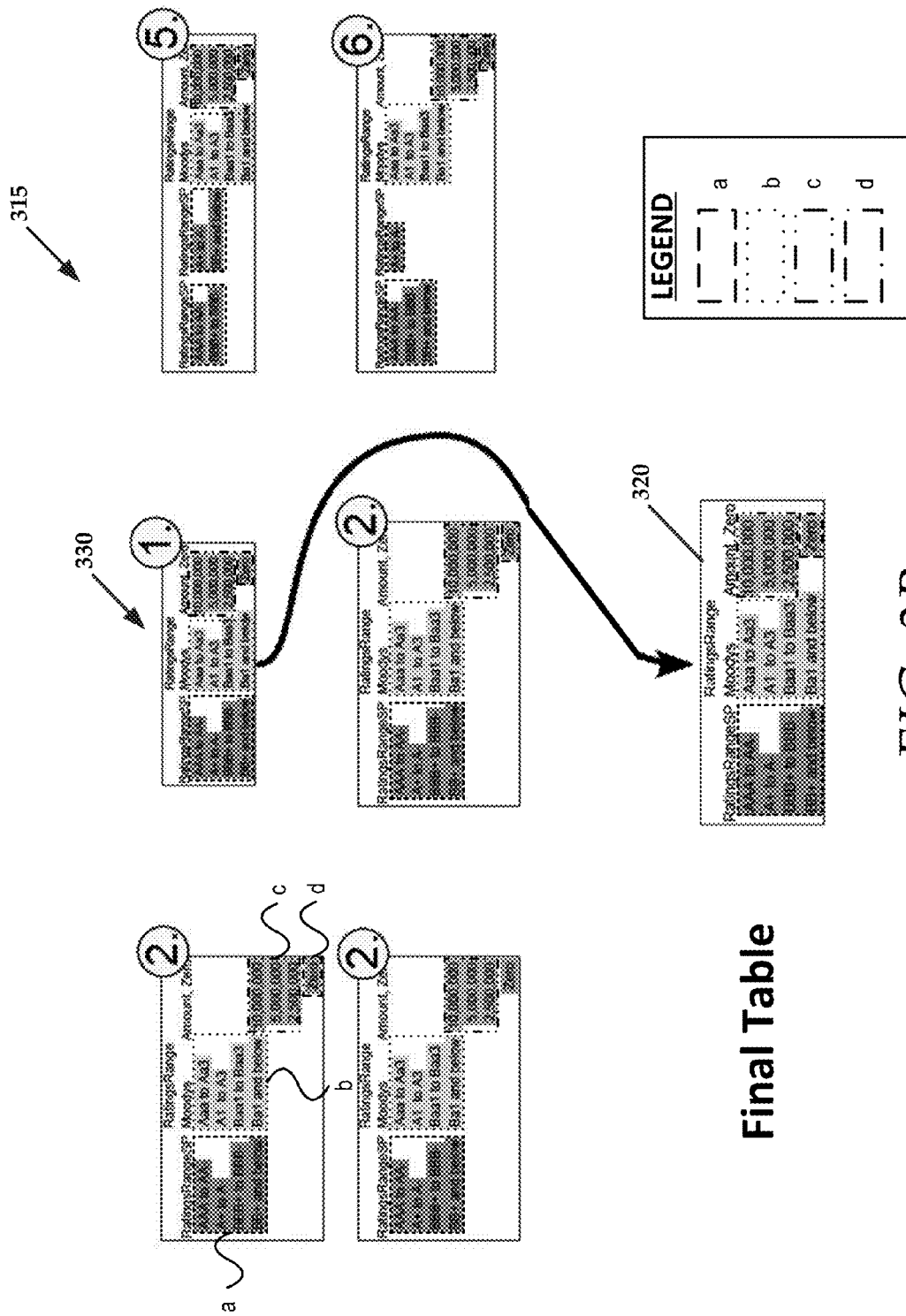
Figure 4B:
Figure 7:
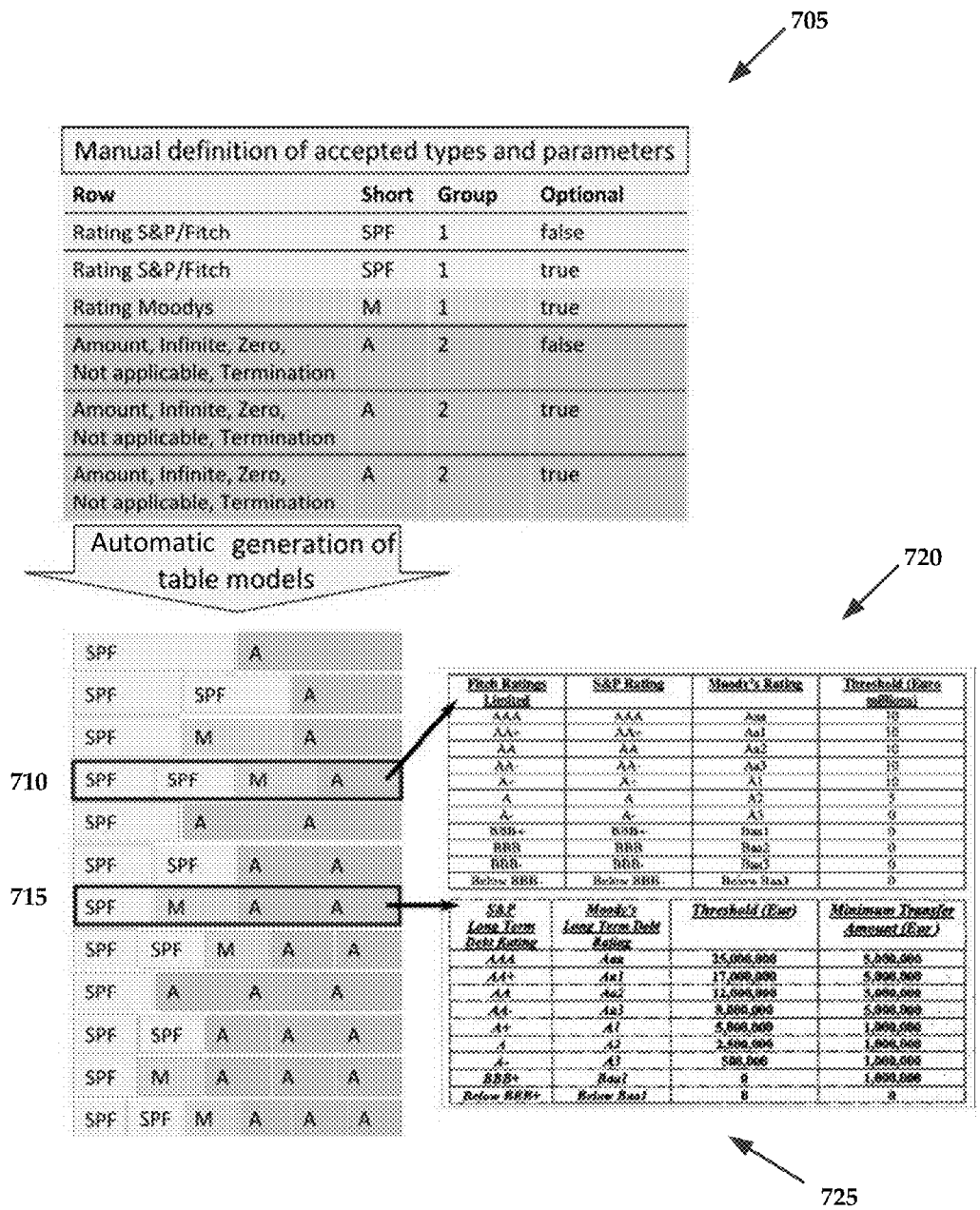
FIG. 7 illustrates an exemplary process for automatic table model generation.

FIGS. 3A-B collectively illustrate an overall workflow process of a table extraction solution provided by the table extraction system 100. The input for the table extraction system 100 includes Annotated Table Cell Data 305 and one or more user defined table models, such as table models 310A, 310B, and 310C. The annotations in FIGS. 3A-B are denoted by distinctive dashed and/or dotted lines indicated by reference labels "a", "b", "c", and "d". It will be understood that FIG. 7 illustrates an exemplary method for generating a table model. A detailed explanation of an exemplary process for populating table models and generating candidates is shown in FIGS. 4A-B.

FIG. 3A also illustrates the execution of filling strategies by the table extraction system 100, using for example, shortest column and row-wise filling strategies to produce a plurality of candidate tables 315. As illustrated, two candidate tables are produced for each table model, due to the application of two separate filling strategies by the table extraction system 100.

In some embodiments, the output of the table extraction process is a new table annotated in the document. After identifying table candidates, a scoring scheme is used by the table extraction system 100 to identify a best candidate table. Normalization can be applied to both candidate and final tables by the table extraction system 100. As an output, the final table is annotated within the document and can then (optionally) be used as a basic item for subsequent table extraction steps.

FIG. 3B illustrates the scoring of candidate tables 315 and the selection of a highest scoring candidate table 320. The selected highest scoring candidate table 320 is referred to as an annotated final table 330. For example, candidate tables generated from table model 310A produce candidate tables that include misaligned columns, for example, the "Amount, Zero" column. Candidate table generated from table model 310B, using the shortest column filling strategy produced the highest scoring candidate table 320. This table was selected for use as the annotated final table 330. Additional detail regarding each of these processes will be described in greater detail below.

FIGS. 4A and 4B collectively illustrate an exemplary table extraction process. It is assumed that two possible OCR outcomes 410A and 410B of a document 405 have been generated. Basic items in both of these OCR outcomes are annotated. FIG. 4B illustrates the use of a table model 415 to collect the basic annotated items. The table extraction system 100 then populates the table model 415 using two different filling strategies. In Outcome One 420, the shortest column filling strategy allows for a perfect recovery of the reordered table. In Outcome Two 425, the row wise filling strategy can compensate for the missing amount in the third row 430.

Figure 5:
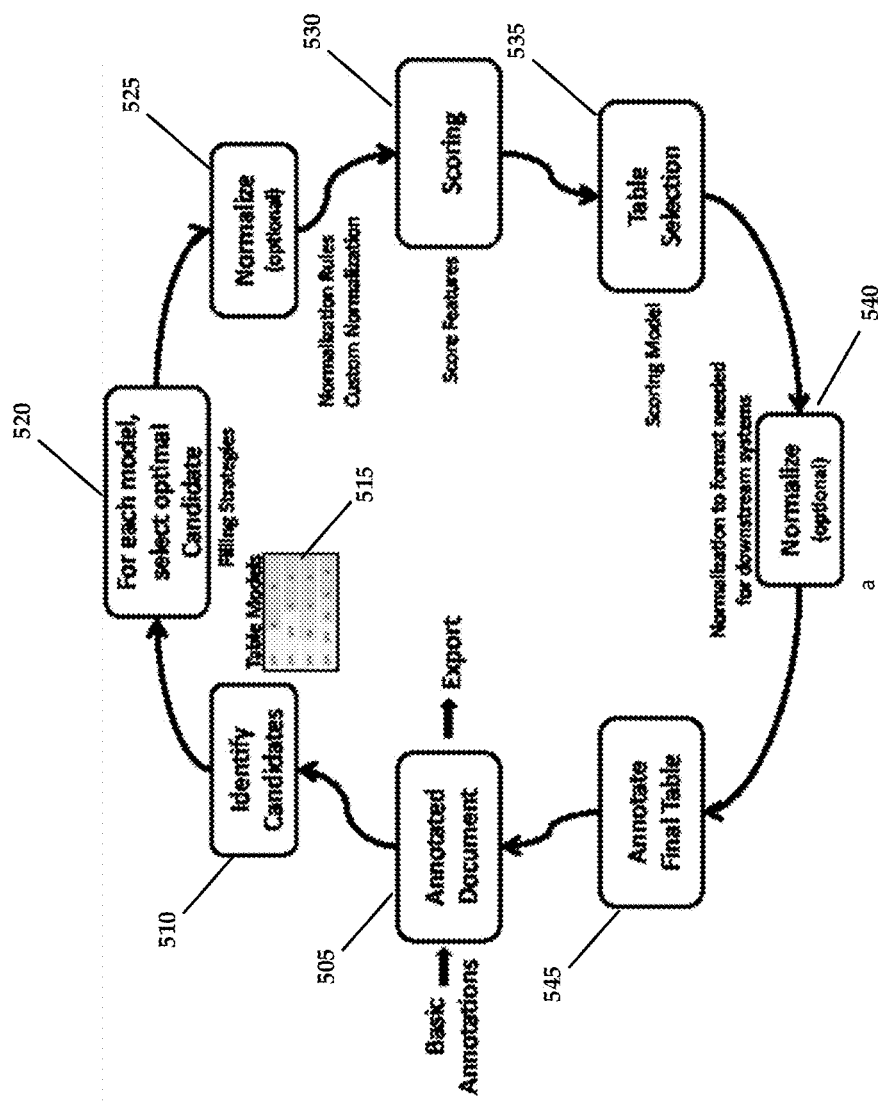
FIG. 5 illustrates a flow diagram of an exemplary method for extracting table information from a document, including scoring, table selection, and normalization sub-processes.

FIG. 5 illustrates an exemplary extraction process executed by the table extraction system 100. FIG. 5 illustrates subsequent steps to the table extraction process (here abbreviated as "Identify Candidates 510"). Note that any step except for the identification of table candidates and their annotation is optional. Annotated tables can also serve as basic items for further tables, thus the solution provided by the table extraction system 100 allows for the extraction of nested tables, as described above.

Referring collectively to FIGS. 4A-5, given a set of configured table models 515 consisting of a set of columns with acceptable annotations and options, and a maximum distance of annotations, the table extraction system 100 may employ such table models to iterate over annotated documents 505. For each table model, the table extraction system 100 collects all annotations acceptable for the columns. As will be discussed in greater detail below, the table extraction system 100 may stop this process if the table extraction system 100 encounters an annotation that is a stop token or determines that an annotation is out of range.

For each filling strategy, the table extraction system 100 distributes the annotations among the columns according to the strategy. Next, the table extraction system 100 calculates a fraction of filled cells c and a filling strategy specific score s. Both c and s are assumed to be equal or greater than 0 and equal or less than 1. Next, the table extraction system 100 annotates the candidate table generated by the strategy that maximizes the score $f=c*s$. It will be understood that if f meets or exceeds a predefined threshold, the table extraction system 100 adds the table candidate to a document index. Candidate tables that fail to meet the predefined threshold are not further considered by the table extraction system 100. FIG. 1 illustrates a document index 140 can be stored in a database 135. The selection of optimal candidate tables is shown as step 520.

Figure 6C:

If necessary, candidate tables can be normalized 525 by the table extraction system 100 to resolve minor issues such as OCR distortions. FIGS. 6A-C collectively illustrate an exemplary method for resolving OCR distortions using normalization.

Next, the table extraction system 100 scores (530) the candidate tables. More specifically, the table extraction system 100 generates a set of scoring features, and calculates the scoring features for each table candidate. In some instances, the table extraction system 100 may use a linear combination of the score features and a table score is generated. The scoring model allows the table extraction system 100 to select (535) candidate tables using the scoring method above, as well as an optional step of normalizing the selected tables. This second normalization procedure can be applied to the final table to present it in the UI and/or allow downstream systems to access the data. Finally the table extraction system 100 annotates the highest-scoring, annotated final table (545).

FIGS. 6A-C collectively illustrate the normalization of a table. This table could include a final table, as mentioned above. As context, the OCR input may contain resolvable errors, which can be addressed in the initial steps of annotating the document using a rule-based schema. In a subsequent step, the result can be transformed into a format required for subsequent systems.

In the presence of noisy text, such as distortions in text due to the side-effects of OCR, which may reorder the table elements in an unpredictable way, dealing with sparse tables or missing annotations requires several options on how to distribute the collected annotations among the rows and columns. This is especially true when some columns accept the same annotation types. To address these issues, the table extraction system 100 is configured to implement filling strategies that inform the table extraction system 100 how to add annotations and line breaks into the tables. Each filling strategy can also calculate a score that reflects how well the collected annotations can be distributed using a particular strategy. Currently, the following strategies are implemented by the table extraction system 100. The table extraction system 100 can implement a shortest column filling strategy where each annotation is added to the shortest applicable column. Using this strategy, a table can be correctly extracted, as long as there is no reordering within a column. However, this strategy may not work efficiently in the presence of empty cells. Thus, the table extraction system 100 may also use row-wise filling strategies where the annotations are assumed to arrive row-wise. A line break is introduced when for the current row a column is to be filled for the second time.

Also, the table extraction system 100 may implement a row-wise filling strategy with line breaks that operates similarly to the row-wise strategy above, but also allows for line breaks in the neighborhood of annotations. This strategy works best if the line structure of the table was not distorted by the OCR. Instead of line breaks, enumeration marks or other specific markers can be used by the table extraction system 100. In some instances, the table extraction system 100 may use column-wise filling strategies. These strategies are useful when a table was reordered during OCR extraction so that all annotations for a specific column arrive directly after each other. Line breaks may be introduced when already-filled columns are revisited.

With regard to normalization, the table extraction system 100 may implement normalization during table extraction at several levels. For example, the table extraction system 100 may use normalization to rectify missing or ambiguous annotations. In these instances, rule-based systems can be used. These rules can be defined as a set of pre-conditions and post conditions for table rows. If the pre-condition is satisfied, the post-condition is inserted into the table. This process is usually applied during extraction of annotations from the document.

In other instances, tables given in the documents are in most cases not in the desired output format. Therefore, a custom normalization that reflects domain specific knowledge is employed.

FIGS. 6A-C collectively illustrate an exemplary normalization process where repeat table cell data is located in two adjacent rows by the table extraction system 100. FIG. 6A illustrates the original table in the document. FIG. 6B illustrates the OCR version of the document where an OCR error has occurred, namely the inclusion of BAA1 in adjacent rows. Using domain knowledge, the table extraction system 100 can determine that the second instance of BAA1 should be BAA2, as illustrated in FIG. 6C. A compact output format table is then generated.

With regard to scoring, documents may contain several locations that have annotations that could be interpreted as a table of a specific type. Usually, the desired location exhibits a certain pattern, for example, giving rise to a short, dense table. Uninteresting regions, in contrast, may contain annotations that would lead to a table being generated with many missing annotations. Additionally, the different table models employed by the table extraction system 100 using different filling strategies (see above) may lead to different tables that require weighting or other scoring.

In order to find the best table, the table extraction system 100 calculates a set of scoring features for each candidate table. The scoring features encompass the original table candidate score, general properties of the table, such as number of rows, columns, missing cells, length or density of annotations. Domain specific features such as decreasing order of amounts or ratings can also be used by the table extraction system 100.

For scoring, either an informal model adjusted with expert knowledge or a formally fitted linear model can be used. In the former case, weights are set by the user. In the latter case, any regression method can be used to fit a model, using the final table precision as a target function.

FIG. 7 illustrates an exemplary process of automatically generating a table model from user-defined input. It is noteworthy to mention that columns can be optional, thus allowing for different cardinalities of columns. For every possible combination of optional and non-optional columns, a table model is generated. The different models allow for extracting different variants of tables. The user-defined column types and annotations are illustrated in table 705.

For two models 710 and 715, example target tables are illustrated. These two models are used to generate candidate tables 720 and 725, respectively. In general, the table extraction system 100 defines a table model as a set of columns. Each column accepts a set of annotation types and has a set of options directing the interpretation of annotations for this column. Again, columns can be optional, which means they are not necessary for a table to be annotated by the table extraction system 100. This column knowledge directs how the table extraction system 100 uses the user-defined input, expanding the same into a set of specific table models, as shown. The group option allows for defining groups, each of which must be present in the table model.

Further tuning options on the table level allow for defining stop tokens by the table extraction system 100, which end the table collection process and/or indicate a maximum distance in which the basic items are that form the table are expected. If a basic item appears with a greater distance to the previous item than the maximum distance, it is assumed that this item does not belong to the same table.

The following non-limiting list includes other exemplary annotations that can be used for columns. For example: (a) an optional annotation, wherein when a column is annotated as optional two candidate tables are created, one with the optional column and one without; (b) a group annotation, wherein when a column is annotated as a group at least some table cell data is filled into the group; (c) a required annotation, wherein when a column is annotated as required, any row missing an annotation for that column is removed [for example, assume columns A, B, C, are present and B is required. Let for row X column B be empty. Then, row X is removed from the table, which may still be annotated and selected as final table.]; (d) a non-null annotation, wherein when a column is annotated as non-null, if a candidate table lacks this column, the candidate table will not be annotated; (e) a unique annotation, wherein when a column is annotated as unique, all table cells within the unique column include a unique table cell data value; (f) a non-overlapping column, wherein when a column is annotated as non-overlapping, only annotations that do not overlap with previously collected annotations are allowed in the column; (g) an end line column, wherein when a column is annotated as an end line, a current line will end after an annotation is inserted into the column; and (h) a new line column, wherein when a column is annotated as new line column, a new line will begin when table cell data is inserted into this column.

In some instances, the table extraction system 100 may generate a table model by receiving a column set comprising column types and column parameters. It will be understood that each column in the column set is annotated as being optional or non-optional. Using this information, the table extraction system 100 can generate a plurality of table models from permutations of combinations of columns in the column set.

FIGS. 8A and 8B illustrate an exemplary use case for processing documents that include collateral eligibility tables 805 of credit support annex documents. It will be understood that these documents are fairly complex with respect to number and type of columns, original (unconventional) layout, and basic items. As an added complexity, this table is normalized by the table extraction system 100 by splitting the table into three smaller tables with different focus (domain). The OCR version of these tables is shown in FIG. 8B as OCR output. The normalized extraction results are shown in UI 810.

Figure 9:
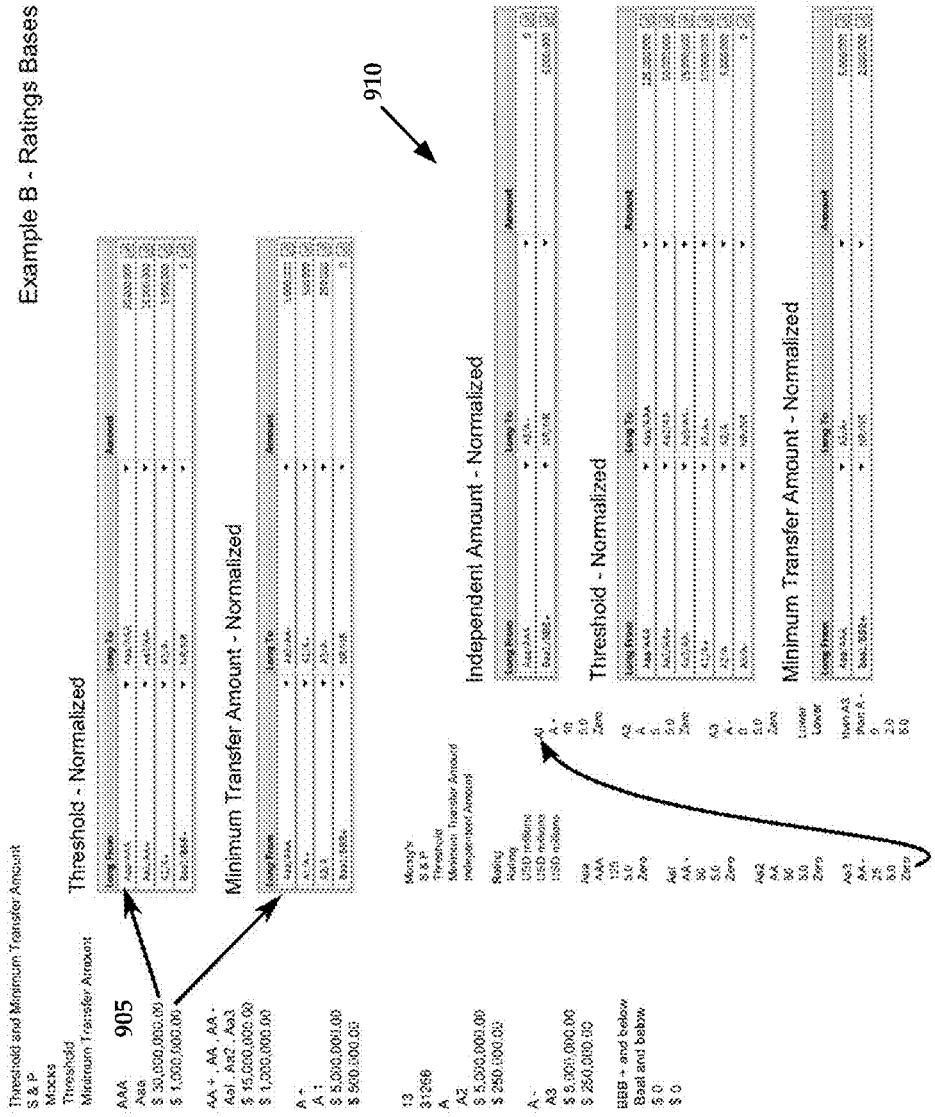
FIG. 9 illustrates an exemplary a plurality of use cases where table information is extracted from documents having information that is not in a traditional or structured table form.

FIG. 9 illustrates an exemplary use case for processing ratings based tables, which are of medium complexity. OCR issues may distort the result, as OCR solutions struggle with the uncommon text items 905. Normalization usually requires determining which column of the table in the document corresponds to which target table. The Independent, Threshold, and Minimum Transfer Amount domains are shown rearranged into tables 910.

FIG. 10 illustrates a plurality of interest rate tables 1005, 1010, 1015, and 1020, which are rather simple and consist of up to four columns and a limited number of rows. The table extraction system 100 can extract these cases with a high confidence.

Figure 11:
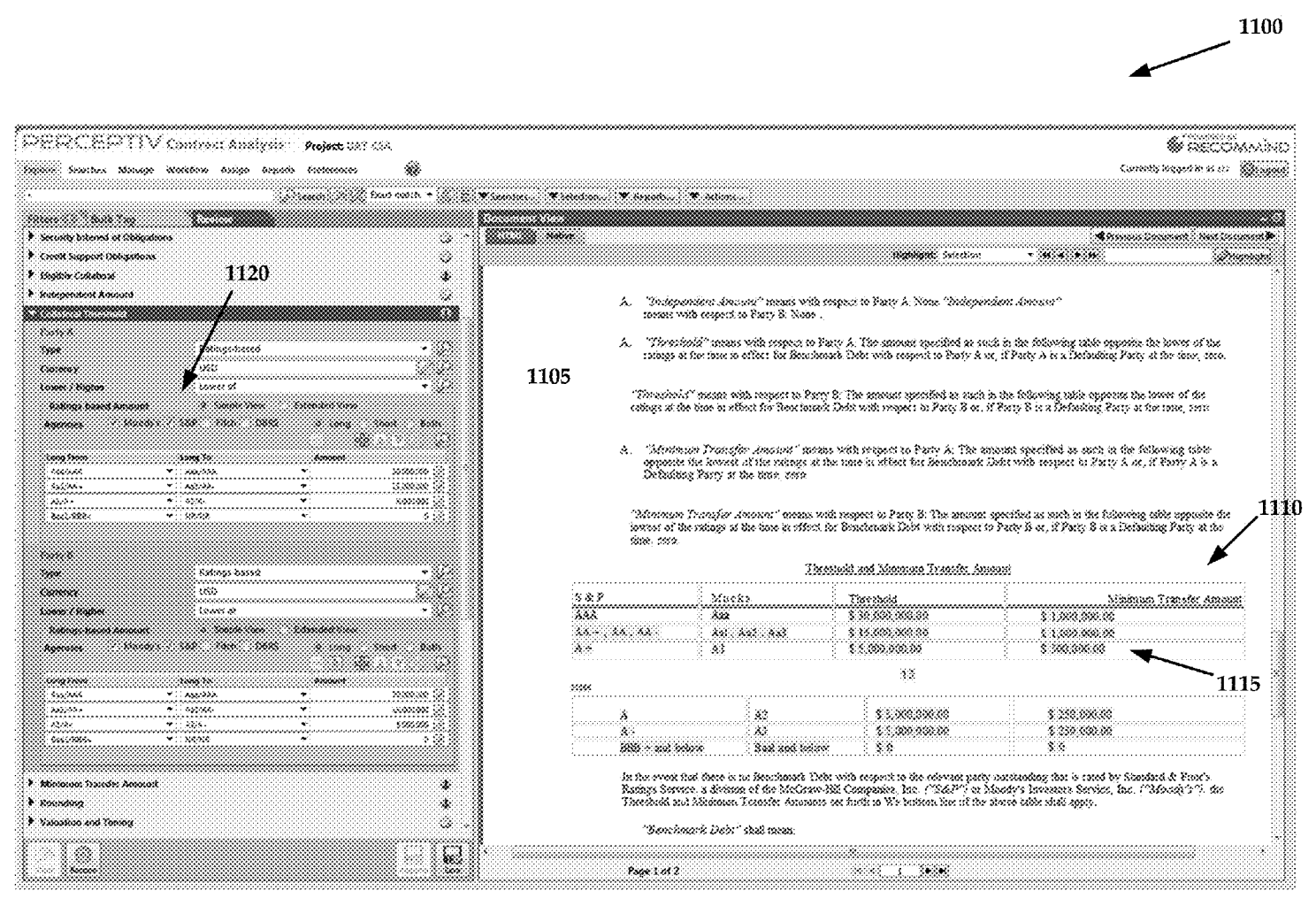

FIG. 11 illustrates an exemplary UI 1100. This UI is generated by the UI generator 120 of the table extraction system 100. The UI 1100 comprises an annotated document 1105 that includes a table 1110 having annotations 1115. The UI 1100 also includes review frame that includes at least one candidate table 1120. The table 1110 is annotated using annotation information included in the candidate table 1120. The user may utilize the UI 1100 to edit table columns and annotations.

Figure 12:
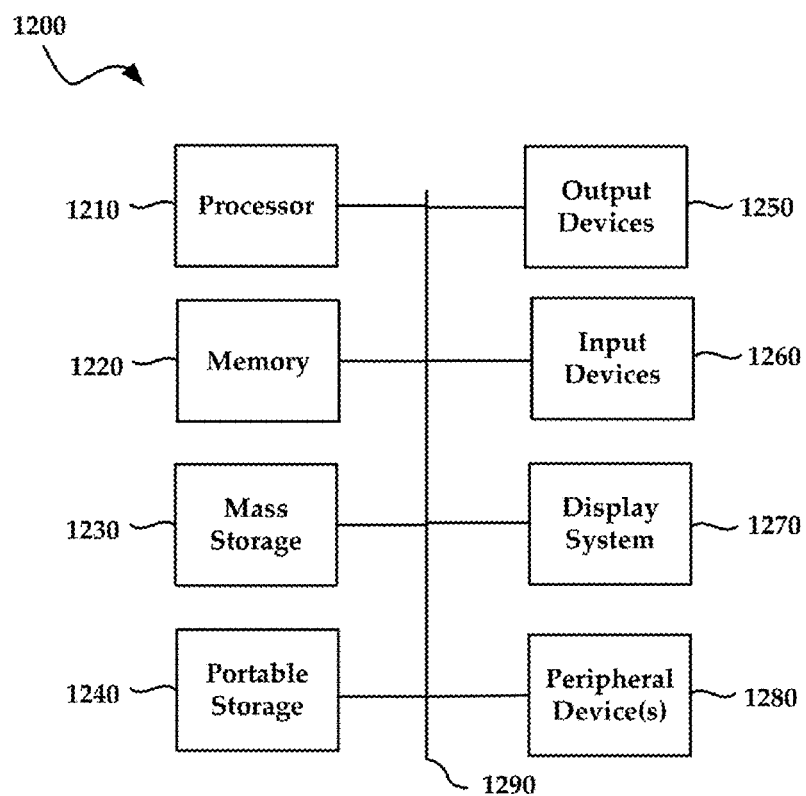
FIG. 12 is a block diagram of an exemplary computing system for implementing embodiments of the present technology.

FIG. 12 illustrates an exemplary computing system 1200 that may be used to implement an embodiment of the present systems and methods. The computing system 1200 of FIG. 12 may be implemented in the contexts of computing devices, networks, webservers (such as the table extraction system 100), databases, or combinations thereof. The computing system 1200 of FIG. 12 includes a processor 1210 and memory 1220. Memory 1220 stores, in part, instructions and data for execution by processor 1210. Memory 1220 may store the executable code when in operation. The computing system 1200 of FIG. 12 further includes a mass storage device 1230, portable storage device 1240, output devices 1250, input devices 1260, a display system 1270, and peripheral devices 1280. The components shown in FIG. 12 are depicted as being connected via a single bus 1290. The components may be connected through one or more data transport means. Processor 1210 and memory 1220 may be connected via a local microprocessor bus, and the mass storage device 1230, peripheral device(s) 1280, portable storage device 1240, and display system 1270 may be connected via one or more input/output (I/O) buses.

Mass storage device 1230, which may be implemented with a magnetic disk drive, solid state disk, or an optical disk drive, is a non-volatile storage device for storing data and instructions for use by processor 1210. Mass storage device 1230 can store the system software for implementing embodiments of the present technology for purposes of loading that software into memory 1220.

Portable storage device 1240 operates in conjunction with a portable non-volatile storage medium, such as a floppy disk, compact disk or digital video disc, to input and output data and code to and from the computing system 1200 of FIG. 12. The system software for implementing embodiments of the present technology may be stored on such a portable medium and input to the computing system 1200 via the portable storage device 1240.

Input devices 1260 provide a portion of a user interface. Input devices 1260 may include an alphanumeric keypad, such as a keyboard, for inputting alphanumeric and other information, or a pointing device, such as a mouse, a trackball, stylus, or cursor direction keys. Additionally, the computing system 1200 as shown in FIG. 12 includes output devices 1250. Suitable output devices include speakers, printers, network interfaces, and monitors.

Graphics display 1270 may include a liquid crystal display (LCD) or other suitable display device. Graphics display 1270 receives textual and graphical information, and processes the information for output to the display device.

Peripheral devices 1280 may include any type of computer support device to add additional functionality to the computing system. Peripheral device(s) 1280 may include a modem or a router.

The components contained in the computing system 1200 of FIG. 12 are those typically found in computing systems that may be suitable for use with embodiments of the present technology and are intended to represent a broad category of such computer components that are well known in the art. Thus, the computing system 1200 can be a personal computer, hand held computing system, telephone, mobile computing system, workstation, server, minicomputer, mainframe computer, or any other computing system. The computer can also include different bus configurations, networked platforms, multi-processor platforms, etc. Various operating systems can be used including UNIX, Linux, Windows, Macintosh OS, Palm OS, and other suitable operating systems.

Some of the above-described functions may be composed of instructions that are stored on storage media (e.g., computer-readable medium). The instructions may be retrieved and executed by the processor. Some examples of storage media are memory devices, tapes, disks, and the like. The instructions are operational when executed by the processor to direct the processor to operate in accord with the technology. Those skilled in the art are familiar with instructions, processor(s), and storage media.

In some embodiments, the computing system 1200 may be implemented as a cloud-based computing environment, such as a virtual machine operating within a computing cloud. In other embodiments, the computing system 1200 may itself include a cloud-based computing environment, where the functionalities of the computing system 1200 are executed in a distributed fashion. Thus, the computing system 1200, when configured as a computing cloud, may include pluralities of computing devices in various forms, as will be described in greater detail below.

In general, a cloud-based computing environment is a resource that typically combines the computational power of a large grouping of processors (such as within web servers) and/or that combines the storage capacity of a large grouping of computer memories or storage devices. Systems that provide cloud-based resources may be utilized exclusively by their owners or such systems may be accessible to outside users who deploy applications within the computing infrastructure to obtain the benefit of large computational or storage resources.

The cloud may be formed, for example, by a network of web servers that comprise a plurality of computing devices, such as the computing system 1200, with each server (or at least a plurality thereof) providing processor and/or storage resources. These servers may manage workloads provided by multiple users (e.g., cloud resource customers or other users). Typically, each user places workload demands upon the cloud that vary in real-time, sometimes dramatically. The nature and extent of these variations typically depends on the type of business associated with the user.

It is noteworthy that any hardware platform suitable for performing the processing described herein is suitable for use with the technology. The terms "computer-readable storage medium" and "computer-readable storage media" as used herein refer to any medium or media that participate in providing instructions to a CPU for execution. Such media can take many forms, including, but not limited to, non-volatile media, volatile media and transmission media. Non-volatile media include, for example, optical or magnetic disks, such as a fixed disk. Volatile media include dynamic memory, such as system RAM. Transmission media include coaxial cables, copper wire and fiber optics, among others, including the wires that comprise one embodiment of a bus. Transmission media can also take the form of acoustic or light waves, such as those generated during radio frequency (RF) and infrared (IR) data communications. Common forms of computer-readable media include, for example, a floppy disk, a flexible disk, a hard disk, magnetic tape, any other magnetic medium, a CD-ROM disk, digital video disk (DVD), any other optical medium, any other physical medium with patterns of marks or holes, a RAM, a PROM, an EPROM, an EEPROM, a FLASHEPROM, any other memory chip or data exchange adapter, a carrier wave, or any other medium from which a computer can read.

Various forms of computer-readable media may be involved in carrying one or more sequences of one or more instructions to a CPU for execution. A bus carries the data to system RAM, from which a CPU retrieves and executes the instructions. The instructions received by system RAM can optionally be stored on a fixed disk either before or after execution by a CPU.

Computer program code for carrying out operations for aspects of the present technology may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

The corresponding structures, materials, acts, and equivalents of all means or step plus function elements in the claims below are intended to include any structure, material, or act for performing the function in combination with other claimed elements as specifically claimed. The description of the present technology has been presented for purposes of illustration and description, but is not intended to be exhaustive or limited to the invention in the form disclosed. Many modifications and variations will be apparent to those of ordinary skill in the art without departing from the scope and spirit of the invention. Exemplary embodiments were chosen and described in order to best explain the principles of the present technology and its practical application, and to enable others of ordinary skill in the art to understand the invention for various embodiments with various modifications as are suited to the particular use contemplated.

Aspects of the present technology are described above with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present technology. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

What is claimed is:

1. A method, for extracting table information from an unstructured document using a table extraction system that comprises a processor and table extraction logic stored in memory, wherein the processor executes the table extraction logic to perform operations comprising:
    annotating text of the unstructured document with annotations using domain knowledge of the unstructured document to produce annotated table cell data;
    generating a candidate table for each of a plurality of table models using the annotated table cell data, wherein the plurality of table models for the unstructured document are selected by determining a domain for the unstructured document; and selecting table models that are suitable for use with the determined domain;
    scoring each of the candidate tables;
    selecting a highest scoring candidate table; and
    providing the highest scoring candidate table.

2. The method according to claim 1, wherein the document includes an unstructured document and at least some of the text of the document is not in a table format.

3. The method according to claim 1, wherein generating a candidate table for each of a plurality of table models further comprises:
    parsing the annotated table cell data in the unstructured document;
    collecting the annotated table cell data for a table model; and populating columns of a candidate table using the annotated table cell data, using a filling strategy.

4. The method according to claim 3, wherein the filling strategy comprises any of shortest column filling, row-wise filling, row-wise filling with line breaks, and column-wise filling.

5. The method according to claim 3, further comprising:
calculating a fraction of filled cells and a filling strategy specific score;
comparing a product of the fraction of filled cells and the filling strategy specific score to a threshold; and
adding the candidate table to an index if the product meets or exceeds the threshold.

6. The method according to claim 5, further comprising:
generating a set of scoring features for each candidate table; and
generating a table score for each candidate table using a linear combination of the set of scoring features.

7. The method according to claim 1, further comprising terminating collection of annotated table cell data upon encountering a stop token annotation.

8. The method according to claim 1, further comprising normalizing missing or ambiguous annotations in a candidate table.

9. The method according to claim 1, wherein scoring each of the candidate tables comprises calculating any of:
a number of empty cells in a candidate table; and
a number of empty rows in a candidate table.

10. The method according to claim 1, further comprising generating a table model from a user defined set of column types and column parameters.

11. The method according to claim 10, further comprising establishing a stop token for the table model, wherein presence of the stop token in the table model causes the termination of collection of annotated table cell data for the candidate table.

12. The method according to claim 10, further comprising establishing a maximum distance for a table model, wherein when two table cells are spaced apart from one another within the unstructured document at a distance less than or equal to the maximum distance, the two table cells are added to the table model.

13. The method according to claim 1, wherein an annotation associated with the annotated table cell data is at least one of:
an optional annotation, such that when a column is annotated as optional two candidate tables are created, one with the optional column and one without;
a group annotation, such that when a column is annotated as a group at least some annotated table cell data is filled into the group;
a required annotation, such that when a column is annotated as required, any row missing an annotation for that column is removed;
a non-null annotation, such that when a column is annotated as non-null, if a candidate table lacks this column, the candidate table will not be annotated;
a unique annotation, such that when a column is annotated as unique, all table cells within the unique column include a unique annotated table cell data value;
a non-overlapping column annotation, such that when a column is annotated as non-overlapping, only annotations which do not overlap with previously collected annotations are allowed in the column;
an end line column annotation, such that when a column is annotated as an end line, a current line will end after an annotation is inserted into the column; and
a new line column annotation, such that when a column is annotated as new line column, a new line will begin when annotated table cell data is inserted into this column.

14. The method according to claim 1, wherein the unstructured document includes a document that is streamed to the table extraction system, the method of claim 1 being executed during streaming of the document to the table extraction system.

15. A table extraction system for extracting table information from a document, the table extraction system comprising:
a processor; and
a memory for storing table extraction logic that when executed by the processor causes the table extraction system to:
annotate text of a document with basic annotations to produce annotated table cell data, the basic annotations being determined from domain knowledge regarding the document;
extract the annotated table cell data from the document using a table model;
verify the extractions using the domain knowledge; and
generate an extracted table from the annotated table cell data using a table filling strategy.

16. The system according to claim 15, wherein the document includes a document that has been processed using optical character recognition (OCR), wherein the document comprises OCR distorted table elements, wherein the table extraction system corrects the OCR distorted table elements by verifying extractions using domain knowledge.

17. The system according to claim 15, wherein the processor further executes the table extraction logic to normalize the extracted table to format the extracted table in accordance with a desired output format.

18. A method for automatic generation of table models using a table extraction system that comprises a processor and table extraction logic stored in memory, wherein the processor executes the table extraction logic to perform operations comprising:
receiving a column set comprising column types and column parameters, wherein each column in the column set is annotated as optional or non-optional; and
generating a plurality of table models from permutations of combinations of columns in the column set.

19. A method for extracting table information from an unstructured document using a table extraction system that comprises a processor and table extraction logic stored in memory, wherein the processor executes the table extraction logic to perform operations comprising:
receiving an unstructured document;
processing the unstructured document using optical character recognition (OCR) to identify table cell data;
annotating the table cell data to produce annotated table cell data, the annotating using domain knowledge of the unstructured document to establish one or more rows and columns for placement of the annotated table cell data into candidate tables;
generating a candidate table for each of a plurality of table models using the annotated table cell data and the established one or more rows and columns;
scoring each of the candidate tables based on alignment of the established one or more rows and columns of the candidate tables;
selecting a highest scoring candidate table, the highest scoring candidate table having a greatest alignment among the candidate tables; and displaying the highest scoring candidate table as a final table via a user interface (UI).

20. The method according to claim 19, wherein the table cell data is related to bond ratings.

21. The method according to claim 19, wherein the candidate tables are generated using at least one of a: shortest column filling strategy, row-wise filling strategy, and column-wise filling strategy.

22. The method according to claim 19, wherein the candidate tables are normalized to resolve OCR distortions.

23. The method according to claim 19, wherein the final table is displayed in a classic row/column layout using at least one of: whitespace, supporting lines, and coloring.

24. The method according to claim 19, wherein annotations for the annotated table cell data are at least one of:

optional annotations, such that when a column is annotated as optional two candidate tables are created, one with the optional column and one without;

group annotations, such that when a column is annotated as a group at least some table cell data is filled into the group;

required annotations, such that when a column is annotated as required, any row missing an annotation for that column is removed;

non-null annotations, such that when a column is annotated as non-null, if a candidate table lacks this column, the candidate table will not be annotated;

unique annotations, such that when a column is annotated as unique, all table cells within the unique column include a unique table cell data value;

non-overlapping column annotations, such that when a column is annotated as non-overlapping, only annotations which do not overlap with previously collected annotations are allowed in the column;

end line column annotations, such that when a column is annotated as an end line, a current line will end after an annotation is inserted into the column; and new line column annotations, such that when a column is annotated as a new line column, a new line will begin when table cell data is inserted into the column.

\* \* \* \* \*